United States Patent [19]
Hendow et al.

[11] Patent Number: 5,418,641
[45] Date of Patent: May 23, 1995

[54] FABRY-PEROT OPTICAL RESONANT CAVITY SYSTEMS

[75] Inventors: Sami T. Hendow, Monarch Beach; Thomas J. Kujawa, Torrance, both of Calif.

[73] Assignee: Newport Corporation, Irvine, Calif.

[21] Appl. No.: 140,436

[22] Filed: Oct. 25, 1993

[51] Int. Cl.[6] .............................................. G01B 9/02
[52] U.S. Cl. ..................... 359/346; 359/577; 356/352; 372/96
[58] Field of Search .............. 372/92, 95; 356/352; 359/346, 577, 583, 589

[56] References Cited

U.S. PATENT DOCUMENTS

| | | | |
|---|---|---|---|
| 3,808,554 | 4/1974 | Lax et al. | 331/94.5 C |
| 3,825,856 | 7/1974 | Pezot | 331/94.5 C |
| 4,291,281 | 9/1981 | Pinard et al. | 331/94.5 C |
| 4,477,909 | 10/1984 | Salvi et al. | 372/95 |
| 4,769,614 | 4/1988 | Oughtsun | 330/4.3 |
| 4,797,893 | 1/1989 | Dixon | 372/66 |

*Primary Examiner*—Mark Hellner
*Attorney, Agent, or Firm*—Benoit Law Corporation

[57] ABSTRACT

Resonant cavity apparatus comprise a Fabry-Perot optical resonant cavity of a type having families of transverse modes between longitudinal $TEM_{00}$ modes. In such resonant cavity apparatus and in methods of minimizing the effect of transverse modes, families of such transverse modes are merged into longitudinal $TEM_{00}$ modes of the non-confocal Fabry-Perot optical resonant cavity, providing superior optical performance. This may be manifested by a transmission spectrum similar to that of a flat-flat Fabry-Perot cavity, but with superior Finesse and transmission efficiency.

20 Claims, 5 Drawing Sheets

FABRY-PEROT OPTICAL RESONANT CAVITY SYSTEMS

FIELD OF THE INVENTION

The subject invention relates to optical resonant cavity systems and, more specifically, to methods of substantially eliminating transverse modes and operational ambiguities in Fabry-Perot optical resonant cavities, particularly in those of the non-confocal type.

BACKGROUND

Fabry-Perot optical resonant cavity systems are well known, going back to the 19th Century Fabry-Perot interferometer or etalon in which two parallel partially silvered plane glass plates spaced apart at a fixed distance produce interference spectra by multiple reflection therebetween.

Fabry-Perot optical resonant cavity systems are known to be useful in spectroscopy, linewidth reduction in lasers, optical spectral analysis, optical communication, wavelength division multiplexing, multichannel and tunable spectral filtering, and spectral noise reduction.

In term of spectra, three categories of Fabry-Perot interferometers can be recognized: flat-mirror cavities, confocal and non-confocal cavities. Flat-mirror cavities have clear and unambiguous spectral lineshape, i.e. they have no visible transverse modes. However, they have the disadvantage that waveform diffraction ,acts to limit the overall cavity finesse and efficiency, reducing its resolution and use, such as in communication multichannel filtering. Confocal cavities also have clear and unambiguous lineshape, however, they cannot be manufactured with large Free Spectral Ranges due to the severe requirement for short radii of curvatures of the mirrors. Also, the radius necessary for confocality restricts the optical path length achievable with confocal mirror cavities.

Non-confocal cavities can have large Free Spectral Ranges and super high finesse, and overcome waveform diffraction by continuously refocussing the resonant waveform inside the cavity. However, non-confocal cavities suffer from the presence of non-degenerate transverse modes that limit an unambiguous spectral filtering capability of the device. That is also the case with flat-mirror or other cavities that have lens between the mirrors which produces non-degenerate transverse modes that limit an unambiguous spectral filtering capability of the device, and that therefore may be classified as non-confocal cavities, in contradistinction to pure flat-mirror cavities of the above mentioned kind.

SUMMARY OF THE INVENTION

It is a general object of the invention to overcome the drawbacks and to meet the needs set forth or implicit herein.

It is a germane object of the invention to merge the resonant frequencies of transverse modes to that of the fundamental mode in Fabry-Perot optical resonant cavities.

It is a related object of the invention to provide Fabry-Perot optical resonant cavities with spectral performances similar to that of pure flat-mirror cavities, but with much better cavity bandwidths and transmission efficiencies.

It is also an object of the invention to provide Fabry-Perot optical resonant cavities with spectral performances similar to that of confocal-mirror cavities, but with higher Free Spectral Range capabilities and without presence of the merged odd transverse cavity modes typical with confocal cavities.

It is a further object of the invention to provide basically flat-mirror Fabry-Perot optical resonant cavities with spectral performances similar to that of confocal-mirror cavities, but with higher Free Spectral Range capabilities and without presence of the merged odd transverse cavity modes typical with confocal cavities.

Other objects will become apparent in the further course of this disclosure.

The invention resides in methods of minimizing the effect of transverse modes of a Fabry-Perot optical resonant cavity of a type having families of such transverse modes between longitudinal $TEM_{00}$ modes. The invention according to this aspect thereof merges the families of transverse modes into the longitudinal $TEM_{00}$ modes of the non-confocal Fabry-Perot optical resonant cavity.

The invention resides also in resonant cavity apparatus, comprising, in combination, a Fabry-Perot optical resonant cavity of a type having families of transverse modes between longitudinal $TEM_{00}$ modes, and means for merging such families of transverse modes into longitudinal $TEM_{00}$ modes of that Fabry-Perot optical resonant cavity. From another aspect thereof, the invention resides in a Fabry-Perot optical resonant cavity bounded by spaced mirrors of which at least one is curved giving rise to families of transverse modes between longitudinal $TEM_{00}$ modes, wherein parameters of that resonant cavity obey an equation selected from the group of:

$$\infty > R_1 R_2/(R_1 + R_2) > 4L[mF/\pi]^2$$
$$\infty > R > 8L[mF/\pi]^2$$
$$\infty > R_3 > 4L[mF/\pi]^2$$
$$L < (R/8) [\pi/mF]^2$$

wherein:

R is the radius of curvature of each of said cavity mirrors if said cavity mirrors have equal radii, $R_1$ is a radius of curvature of one of said mirrors, and $R_2$ is a radius of curvature of the other mirror said mirrors have unequal radii, $R_3$ is a radius of curvature of one of said mirrors if the other mirror is flat, with radius meaning radius of curvature of a spherical mirror and radius of curvature of a best fit circle in case of a non-spherically curved mirror, m is the number of transverse modes merged to said longitudinal fundamental $TEM_{00}$ mode, $\pi = 3.1415926 \ldots$, F is cavity finesse, a dimensionless quantity equal to $$\frac{FSR}{\Delta\nu}$$

$\Delta\nu$ is cavity bandwidth,

FSR is the Free Spectral Range of said Fabry-Perot optical resonant cavity equal to $$\frac{c}{2L}$$

c is the speed of light,

L is the optical path length of said cavity between said spaced mirrors, and

∞ is infinity,
whereby the m transverse modes are merged into the longitudinal fundamental TEM$_{00}$ modes of said resonant cavity.

Species according to the invention include a non-confocal Fabry-Perot optical resonant cavity comprising two spaced spherical mirrors of different radii of curvatures R$_1$ and R$_2$ dimensioned so that $$\infty > R_1R_2/(R_1+R_2) > 4L\,[mF/\pi]^2$$

wherein:
m is the number of transverse modes merged to a fundamental TEM$_{00}$ mode,
$\pi = 3.1415926\ldots$,
F is cavity finesse, a dimensionless quantity equal to $$\frac{FSR}{\Delta \nu}$$

$\Delta \nu$ is cavity bandwidth,
FSR is tile Free Spectral Range of the Fabry-Perot optical resonant cavity equal to $$\frac{c}{2L}$$

c is the speed of light,
L is the optical path length of the cavity between said spaced mirrors, and
∞ is infinity.

One of these mirrors may be convex and one of the radii then is negative for that convex mirror.

Another specie of the invention includes a non-confocal spherical mirror Fabry-Perot optical resonant cavity comprising two spaced spherical mirrors of equal radii of curvature R dimensioned so that $$\infty > R > 8L[mF/\pi]^2$$

wherein:
R is the radius of curvature of each of the spherical cavity mirrors,
m is the number of transverse modes merged to a fundamental TEM$_{00}$ mode,
$\pi = 3.1415926\ldots$,
F is cavity finesse, a dimensionless quantity equal to $$\frac{FSR}{\Delta \nu}$$

$\Delta \nu$ is cavity bandwidth,
FSR is the Free Spectral Range of the Fabry-Perot optical resonant cavity equal to $$\frac{c}{2L}$$

c is the speed of light,
L is the optical path length of the cavity between the mirrors, and
∞ is infinity.

Another specie of the invention includes a non-confocal Fabry-Perot optical resonant cavity made of two spaced mirrors of which one mirror is flat and the other mirror curved about a radius R of $$\infty > R > 4L[mF/\pi]^2$$

wherein:
m is the number of transverse modes merged to a fundamental TEM$_{00}$ mode,
$\pi = 3.1415926\ldots$,
F is cavity finesse, a dimensionless quantity equal to $$\frac{FSR}{\Delta \nu}$$

$\Delta \nu$ is cavity bandwidth,
FSR is the Free Spectral Range of the Fabry-Perot optical resonant cavity equal to $$\frac{c}{2L}$$

c is the speed of light,
L is the optical path length of the cavity between said spaced mirrors, and
∞ is infinity.

Another specie of the invention includes a non-confocal Fabry-Perot optical resonant cavity comprising two spaced mirrors of which at least one has a non-spherical configuration, such mirrors having dimensions so that $$\infty > R_1R_2/(R_1+R_2) > 4L[mF/\pi]^2$$

wherein:
R$_1$ is the radius of the best fit circle which can be inscribed in the mirror of non-spherical configuration,
R$_2$ is the radius of curvature of the other mirror,
m is the number of transverse modes merged to a fundamental TEM$_{00}$ mode,
$\pi = 3.1415926\ldots$,
F is cavity finesse, a dimensionless quantity equal to $$\frac{FSR}{\Delta \nu}$$

$\Delta \nu$ is cavity bandwidth,
FSR is the Free Spectral Range of the Fabry-Perot optical resonant cavity equal to $$\frac{c}{2L}$$

c is the speed of light,
L is the optical path length of the cavity between said spaced mirrors, and
∞ is infinity.

From a germane aspect thereof, the invention resides in a Fabry-Perot optical resonant cavity bounded by spaced mirrors, com-prising, in combination, an intracavity element of a type giving rise to families of transverse modes between longitudinal TEM$_{00}$ modes, and means for merging such families of transverse modes into the longitudinal TEM$_{00}$ modes of the Fabry-Perot optical resonant cavity. In such case the mirrors may be flat.

From a related aspect thereof, the invention resides in a Fabry-Perot optical resonant cavity, comprising, in combination, two spaced substantially flat mirrors, and an intracavity lens; said resonant cavity having a cavity length of $$L < (f/4)[\pi/mF]^2$$

wherein:

f is a focal length of said lens,
n is index of refraction of said intracavity lens,
m is the number of transverse modes merged to said longitudinal fundamental TEM$_{00}$ mode,
$\pi = 3.1415926\ldots$,
F is cavity finesse, a dimensionless quantity equal to $$\frac{FSR}{\Delta \nu}$$

$\Delta \nu$ is cavity bandwidth,
FSR is the Free Spectral Range of said Fabry-Perot optical resonant cavity equal to $$\frac{c}{2L}$$

c is the speed of light, and
L is the optical path length of said cavity between said spaced mirrors.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

The drawings not only illustrate equipment, but also methods of eliminating observed transverse modes $\nu_q$ in a Fabry-Perot optical resonant cavity bounded by spaced cavity mirrors. The two mirrors need not be identical in design, for example one could be spherical while the other is non-spherical or flat. Alternatively, both could be flat with a lens therebetween.

Figure 1:
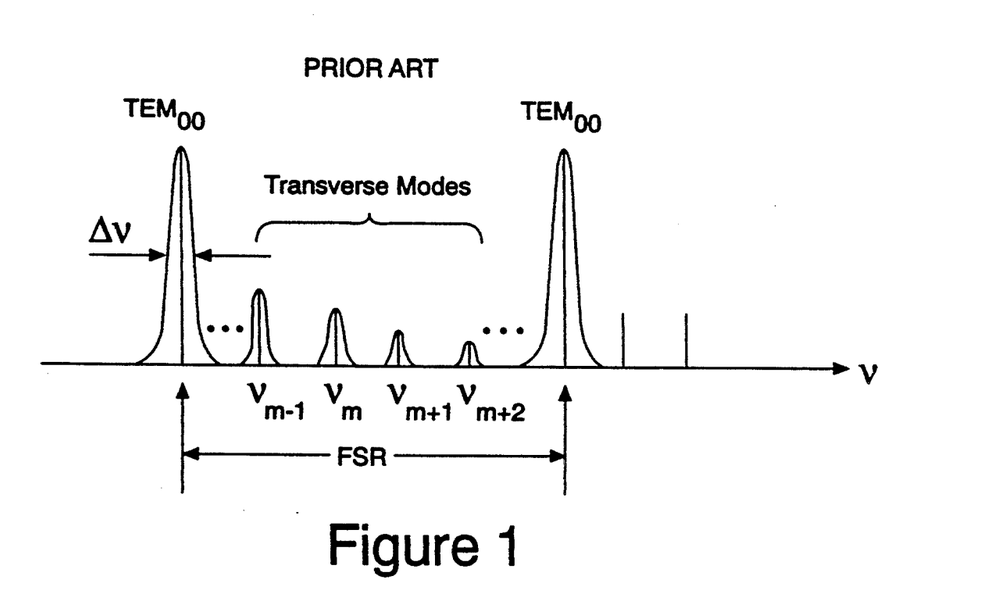
FIG. 1 is a spectrum of modes of a prior-art non-confocal Fabry-Perot optical resonance cavity.
Figure 2:
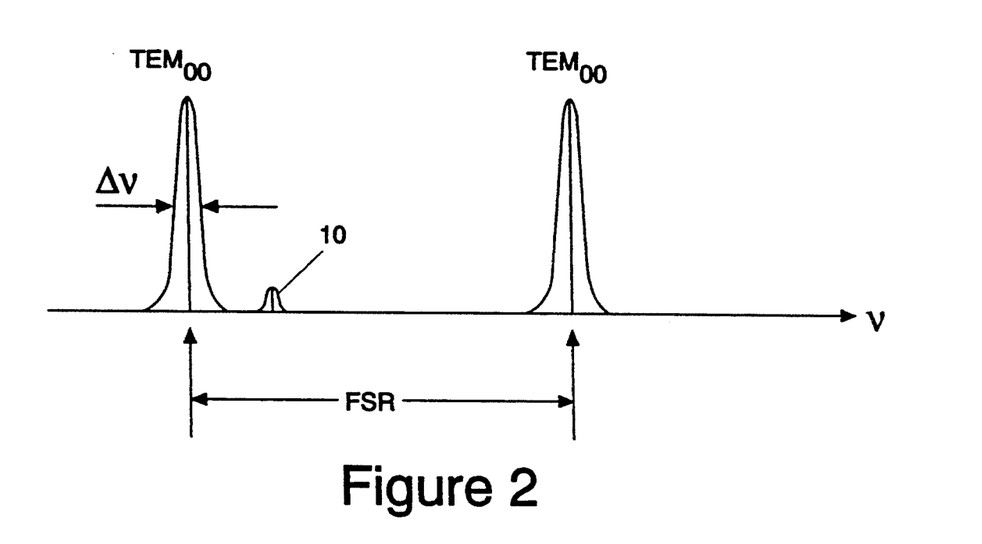
FIG. 2 is a showing similar to FIG. 1, but illustrating a spectrum of a Fabry-Perot resonant cavity according to a preferred embodiment of the invention.

The cavity is provided with a bandwidth $\Delta \nu$ and Free Spectral Range or FSR as shown in FIGS. 1 and 2. By way of example, this is done when designing the cavity by choosing mirrors of reflectivities that yield the desired cavity Finesse or F and throughput or efficiency. The mirror spacing is chosen to yield the desired Free Spectral Range. The choice of the cavity Finesse yields the desired cavity bandwidth according to the equation:

$$\Delta \nu = \frac{FSR}{F} \qquad (1)$$

Figure 3:
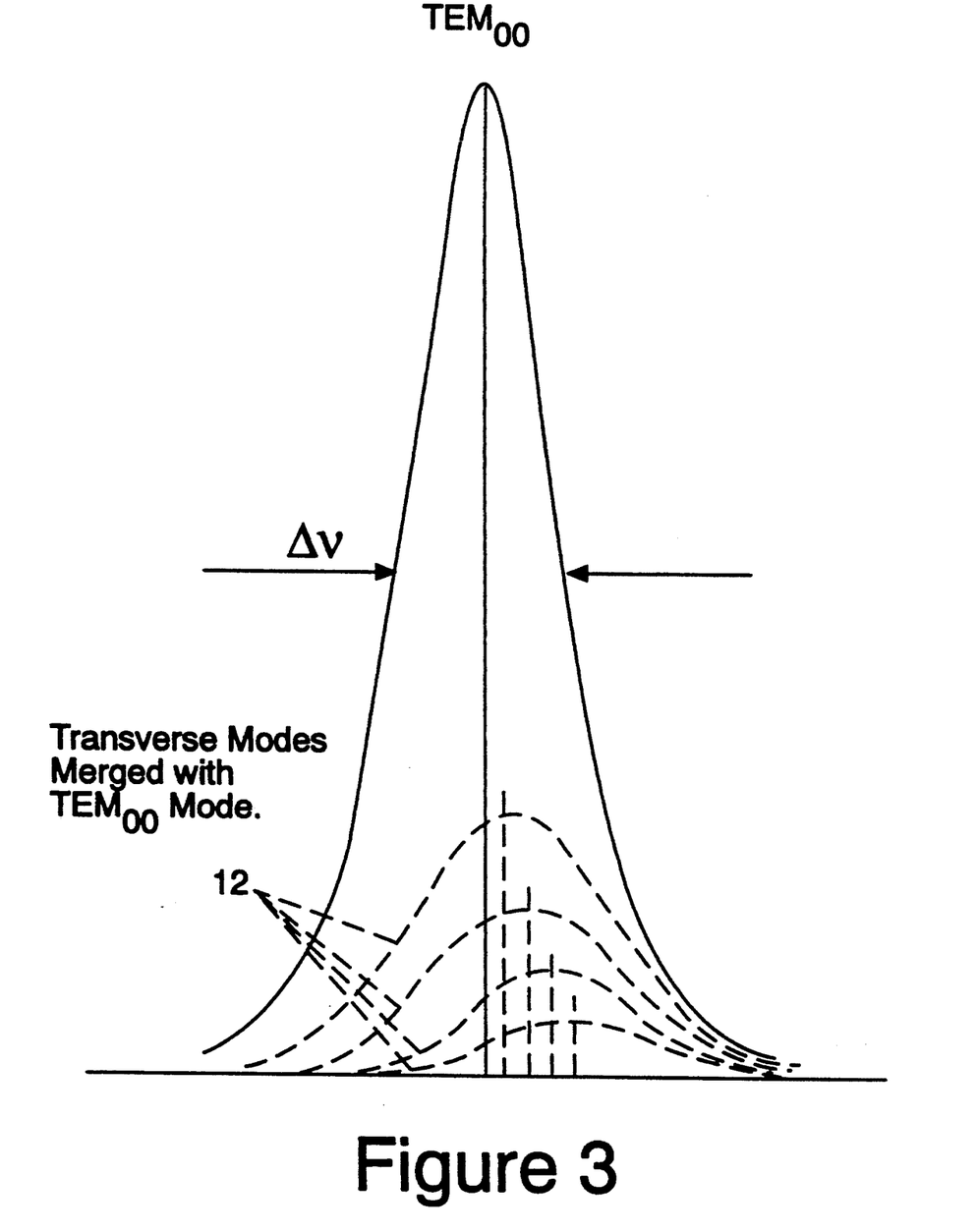
FIG. 3 is an enlarged view of a longitudinal mode with a family of transverse modes merged therein.

By way of background, FIG. 1 shows a spectrum of modes of a prior-art non-confocal Fabry-Perot optical resonance cavity having several transverse modes. As already mentioned above, such non-confocal cavities suffer from the presence of non-degenerate transverse modes $\nu_{m-1}$, $\nu_m$, $\nu_{m+1}$, etc., that limit an unambiguous spectral filtering capability of the device. For instance, interferometers using such non-confocal cavities tend to lock in on one of the significant transverse modes, instead of the fundamental TEM$_{00}$ mode. Such transverse modes may be referred to as TEM$_{mn}$ modes. In FIG. 1, the designation $\nu_m$ is used as an abbreviation, where $\nu$ is the frequency of that transverse mode and m is its sequence number. Note that m=0 refers to the fundamental mode TEM$_{00}$, m=1 is the first mode adjacent to it, and so forth. The spacing between these transverse modes is approximately equal. Hence the mth mode may be arrived at by counting m mode spacings. Each one of these transverse modes may be a combination of other transverse modes, for example the m=1 mode may be a combination of TEM$_{01}$ and TEM$_{10}$ modes. As a simplification, we have assumed that the frequencies of the transverse modes contained in the mth mode all have the same frequency $\nu_m$. The subject of the illustrated embodiments of the invention is to reduce the uniform spacing between the transverse modes so that the first m modes are merged with the fundamental mode, such as shown in FIG. 3. In practice, only the first few modes are significant and need to be merged, particularly in a mode-matched Fabry-Perot interferometer.

FIG. 2 is a showing similar to FIG. 1, but illustrating a spectrum of a Fabry-Perot resonant cavity according to a preferred embodiment of the invention, wherein a family of transverse modes $\nu_{m-1}$, $\nu_m$, and $\nu_{m+1}$ has been merged into the longitudinal TEM$_{00}$ mode of the non-confocal Fabry-Perot optical resonant cavity. In practice, very small or other insignificant transverse modes 10 may be left in the spectrum and need not be merged into the longitudinal TEM$_{00}$ modes, since they do not raise the danger of ambiguities or other significant interference. The result is still better than the spectrum of confocal cavities that have a significant transverse mode between longitudinal modes.

FIG. 3 is an enlarged showing of a longitudinal mode TEM$_{00}$ indicating the cavity bandwidth $\Delta \nu$ (herein full width, half maximum) and depicting a number of m transverse modes 12 merged therewith according to a preferred embodiment of the invention.

In practice, the showing of FIGS. 2 and 3 repeats itself for families of transverse modes between longitudinal TEM$_{00}$ modes; whereby such families of transverse modes are merged into the longitudinal TEM$_{00}$ modes pursuant to the subject invention.

Figure 4:
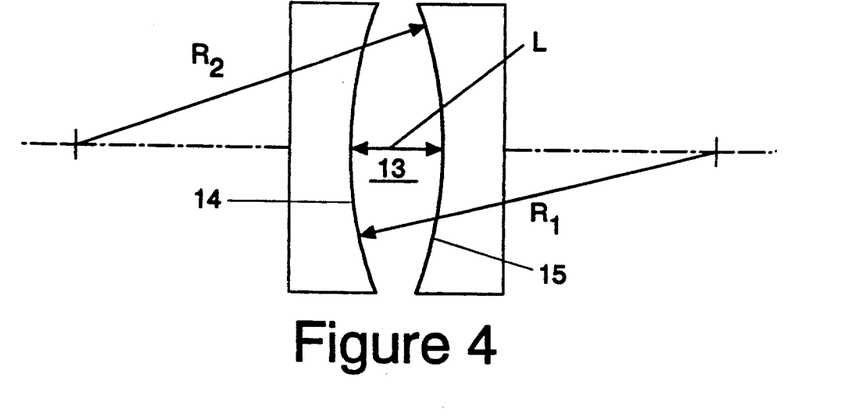
FIG. 4 is somewhat diagrammatic side view of a non-confocal Fabry-Perot resonant cavity pursuant to a typical embodiment of the invention.

In this respect, FIG. 4 diagrammatically shows a non-confocal resonant cavity 13 made of two spherical mirrors 14 and 15 of different radii of curvatures R$_1$ and $R_2$. The condition for merging m transverse modes with the longitudinal $TEM_{00}$ mode for this case is:

$$\infty > R_1R_2/(R_1+R_2) > 4L[mF/\pi]^2 \quad (2)$$

To simplify mathematical expressions, the conditions $R_1>>L, R_2>>L$ and $F>>1$ are assumed for Equation (2), wherein:

m is the number of transverse modes merged to a fundamental $TEM_{00}$ mode, $\pi = 3.1415926...$, F is cavity finesse, a dimensionless quantity equal to $$\frac{FSR}{\Delta\nu} \quad (3)$$

$\Delta\nu$ is cavity bandwidth,

FSR is the Free Spectral Range of the Fabry-Perot optical resonant cavity equal to $$\frac{c}{2L} \quad (4)$$

c is the speed of light,

L is the optical path length of the cavity between the spaced mirrors 14 and 15, and $\infty$ is infinity.

Persons skilled in Fabry-Perot resonant cavity design can realize other complex configurations based on this simple two-mirror configuration, such as multimirror and out-of-plane configurations. In such cases, the invention merges m transverse modes into the longitudinal or fundamental $TEM_{00}$ mode of the cavity by following the principles herein disclosed.

Figure 5:
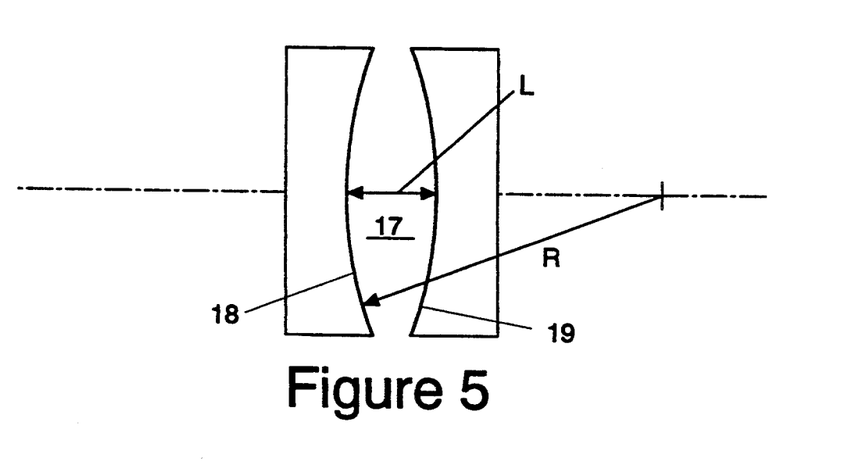
FIG. 5 is a view similar to FIG. 4, but showing a Fabry-Perot resonant cavity according to a further embodiment of the invention using mirrors of equal radii.

What is currently considered the best mode of practicing the invention is illustrated in FIG. 5 in the form of a non-confocal spherical mirror cavity 17 comprising two mirrors 18 and 19 of equal radii of curvature R. In that special case, the condition for merging m transverse modes is:

$$\infty > R > 8L[mF/\pi]^2 \quad (5)$$

wherein:

R is the radius of curvature of each of the spherical cavity mirrors 18 and 19, m is the number of transverse modes merged to a fundamental $TEM_{00}$ mode, $\pi = 3.1415926...$, F is cavity finesse, a dimensionless quantity equal to $$\frac{FSR}{\Delta\nu} \quad \text{same as (3)}$$

$\Delta\nu$ is the cavity bandwidth,

FSR is the Free Spectral Range of the Fabry-Perot optical resonant cavity equal to $$\frac{c}{2L} \quad \text{same as (4)}$$

c is the speed of light,

L is the optical path length of the cavity between the mirrors 18 and 19, and $\infty$ is infinity.

The invention thus merges m transverse modes into the longitudinal or fundamental $TEM_{00}$ mode of the cavity, or, broadly speaking, merges families of transverse modes into longitudinal $TEM_{00}$ modes.

Since the cavity is non-confocal, the optical path length of the cavity may be very small, such as in the ten micron range. By way of example, a typical cavity in that range may be $L = 10$ μm, and a corresponding cavity bandwidth may be $\Delta\nu = 15$ GHz.

Pursuant to Equation (4) this yields a Free Spectral Range of FSR = 15,000 GHz. Pursuant to Equation (3) the cavity finesse then is $F = 1,000$.

For a collapsing of three transverse modes (m=3), Equation (5) then provides a radius of curvature for each mirror 18 and 19 of R being at least 73 meters. In practice that radius may be more than 73 meters, but, the fact that the cavity 17 is said to be a spherical mirror cavity implies that the radius of curvature R has to be less than infinity, or the cavity would be a pure flat-mirror cavity beyond the scope of the invention.

By way of further example, the radius of spherical mirror curvature R has to be more than 15 meters for a cavity optical paths length L of 50 μm, a bandwidth $\Delta\nu$ of 15 GHz, and a finesse F of 200.

Pursuant to another example, the radius of mirror curvature has to be more than 16.5 meters, for a cavity length L of 20 μm and a finesse F of 100 and ten transverse modes m being collapsed into the adjacent $TEM_{00}$ fundamental or longitudinal mode.

Figure 7:
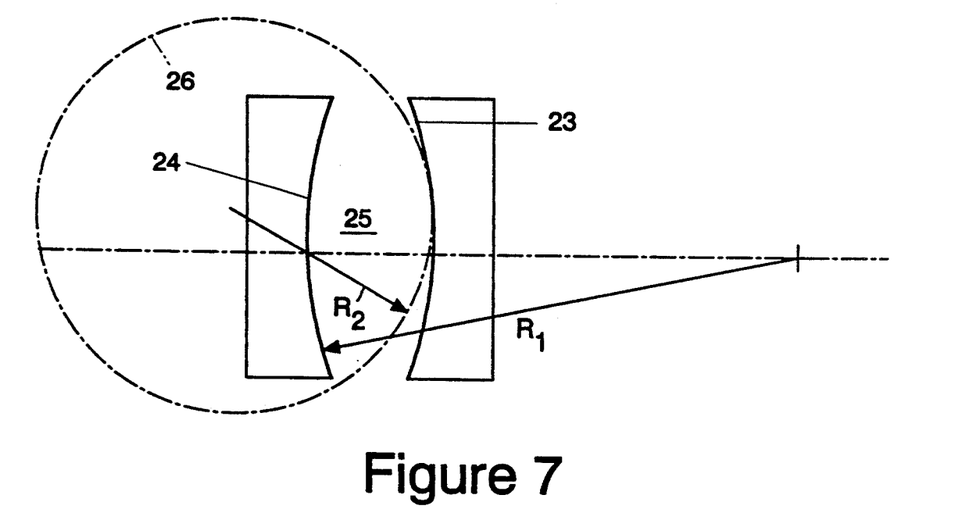
FIG. 7 is a view similar to FIG. 4, but showing a Fabry-Perot resonant cavity according to a further embodiment of the invention using at least one non-spherical mirror.
Figure 8:
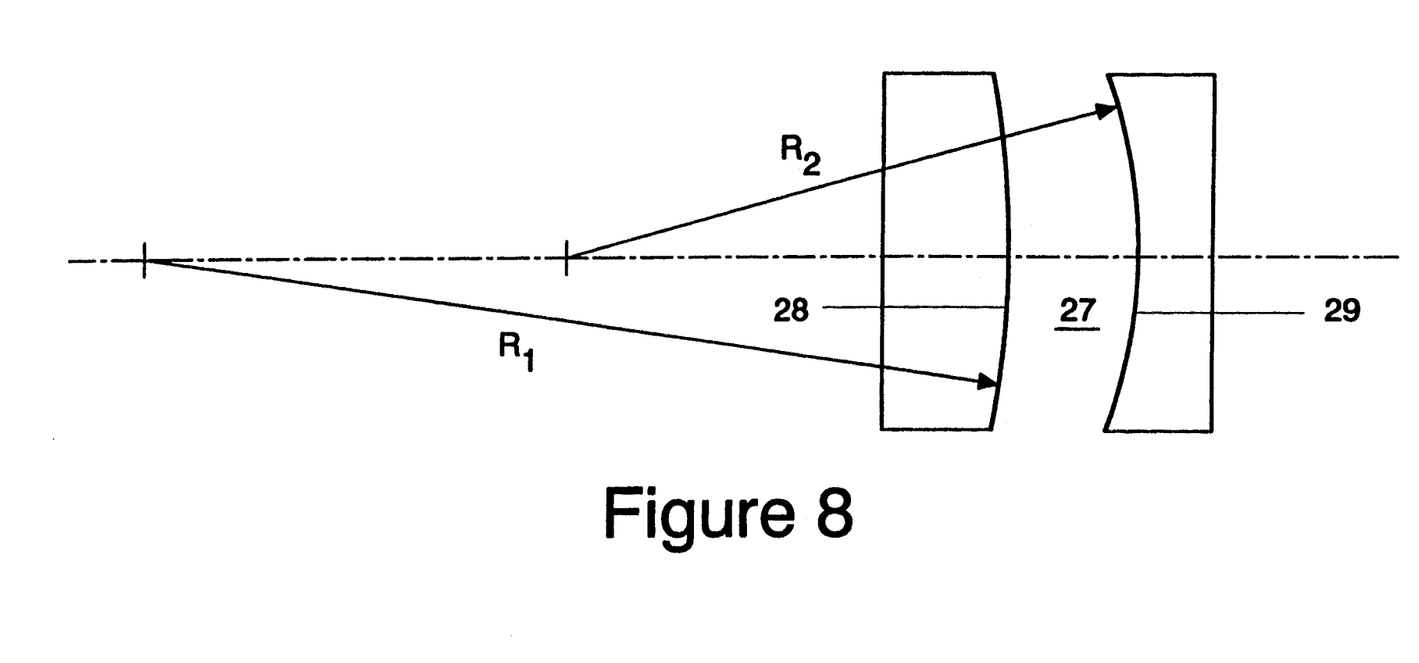
FIG. 8 is a view similar to FIG. 4, but showing a Fabry-Perot resonant cavity according to a further embodiment of the invention using a convex mirror.

In more general terms, if the bandwidth of the cavity shown in FIG. 4 is $$\Delta\nu = \frac{c}{2LF} \quad (6)$$

and the highest expected transverse mode frequency $\nu_{qmn}$ is less than half that cavity bandwidth $\Delta\nu$, then we may see that m transverse modes are merged into longitudinal fundamental $TEM_{00}$ modes, pursuant to the following equation, if the cavity length L is less than $$L < (R/8)[\pi/mF]^2 \quad (7)$$

wherein R may be the radius of curvature of each of the spherical cavity mirrors, if they are of equal radii as in FIG. 5, or R may be $$2R_1R_2/(R_1+R_2) \quad (8)$$

of the mirrors are of unequal radii, such as in FIG. 4 or in FIG. 7 or 8, for example.

Figure 6:
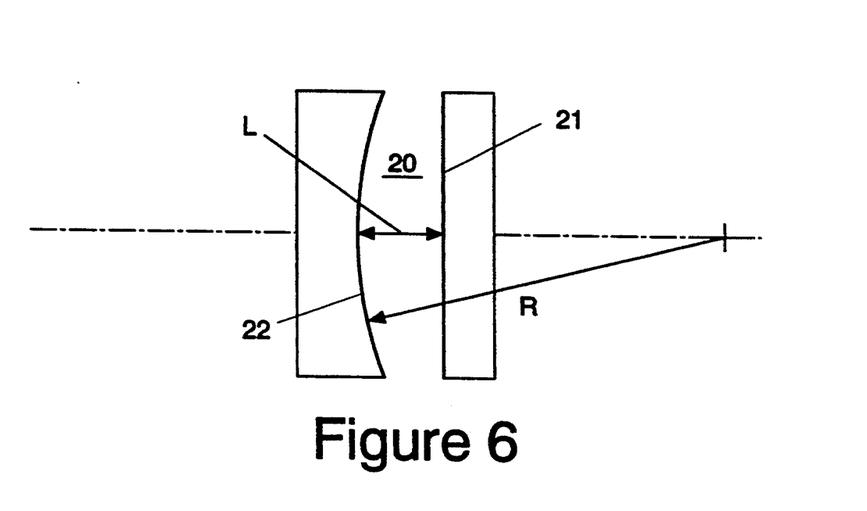
FIG. 6 is a view similar to FIG. 4, but showing a Fabry-Perot resonant cavity according to a further embodiment of the invention using one flat mirror.

Pursuant to another embodiment of the invention, FIG. 6 shows a Fabry-Perot optical resonant cavity 20 wherein one of the cavity mirror 21 is flat, whereas only the other cavity mirror 22 is curved. By way of example, cavity mirror 22 may be spherical, having a radius of curvature R determined as follows:

$$\infty > R > 4L[mF/\pi]^2 \quad (9)$$

Comparing this Equation (9) with the Equation (5) set forth above, it may be noted that the radius of curvature R of the mirror 22 is more than one-half of the minimum radius of curvature of each of the two spherical mirrors 18 and 19 of the like-mirror cavity 17 of FIG. 5. This indicates that it is the curved mirror 22 that would give rise to transverse modes, rather than the flat mirror 21.

The scope of the invention is not limited to spherical cavities. For instance, as depicted in FIG. 7, at least one of the cavity mirrors 23 may have an elliptical, parabolic or other non-spherical configuration.

The other mirror 24 of that cavity 25 may, for instance, be spherical, having a radius $R_1$ of the kind mentioned above in Equation (2) and shown for the mirror 14 of the cavity 13 in FIG. 4. Since the mirror 23 of that cavity 25 is non-spherical, it does not strictly speaking have a radius. However, a radius $R_2$ may, nevertheless, be discerned in practice. Ellipses and parabolas may be considered in terms of projections of a circle, and circles may be inscribed into ellipses and parabolas and into other non-spherical curves. As an approximation, the radius of an inscribed circle 26 in the mirror curvature at 23 may be considered as the radius $R_2$ in the above Equation (2), since that equation requires the product of the radii $R_1R_2$ divided by their sum to be larger than $4L(mF/\pi)^2$. Accordingly, Equation (2) can be satisfied for a merger of transverse modes into longitudinal modes, even if one or both of the mirrors are non-spherical, as long as they are not confocal or both flat.

In particular, if the Fabry-Perot optical resonant cavity 25 is a non-confocal resonant cavity made of two spaced mirrors 23 and 24 of which at least one has a non-spherical configuration, a merger of transverse modes with longitudinal $TEM_{00}$ modes is effected by providing these mirrors with radii of $$\infty > R_1R_2/(R_1+R_2) > 4L[mF/\pi]^2 \qquad (10)$$

wherein:

$R_1$ is the radius of a circle which can be inscribed in the one mirror of non-spherical configuration 23, as the circle that best fits the non-spherical configuration, also known as "best fit circle,"

$R_2$ is the radius of curvature of the other mirror 24, m is the number of transverse modes merged to a fundamental $TEM_{00}$ mode, $\pi = 3.1415926\ldots$, F is cavity finesse, a dimensionless quantity equal to $$\frac{FSR}{\Delta\nu}$$

$\Delta\nu$ is cavity bandwidth,

FSR is the Free Spectral Range of the Fabry-Perot optical resonant cavity equal to $$\frac{c}{2L}$$

c is the speed of light,

L is the optical path length of the cavity 25 between the spaced mirrors 23 and 24, and $\infty$ is infinity.

Equation (5) may be used to effect the desired merger of transverse modes into longitudinal modes for the special case that both mirrors 18 and 19 of the cavity 17 or both mirrors 23 and 24 of tile cavity 25 or their inscribed best fit circles 26 etc. have equal radii R.

FIG. 8 shows another embodiment wherein a Fabry-Perot optical resonance cavity 27 is bounded by a convex mirror 28 and a concave mirror 29. The Equation (2) may be applied to that kind of cavity as well for the desired merger of transverse modes into longitudinal modes, except that the radius $R_1$ of the convex mirror 28 now has a negative value.

In all these cases, if mirror curvatures are known, equation (7), with or without equation (8), may be used to produce resonant cavities wherein families of significant transverse modes are merged into longitudinal $TEM_{00}$ modes.

Figure 9:
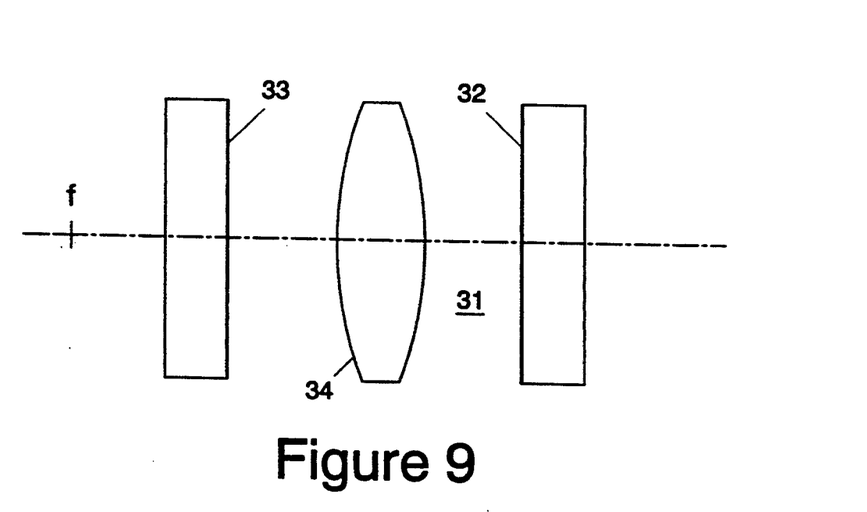
FIG. 9 is somewhat diagrammatic side view of a Fabry-Perot resonant cavity using an intracavity element pursuant to a further embodiment of the invention.

According to a further embodiment of the invention, FIG. 9 shows a resonant cavity 31 having two flat mirrors 32 and 33 and one intermediate lens 34. Examples of such an intermediate lens include a plano-convex lens, a multi-element optical system, a graded index lens or an optical fiber. The intermediate lens acts to refocus the internal rays in a manner similar to that of the spherical end mirrors of the earlier cases, thereby converting the flat-flat cavity to, for example, a non-confocal cavity. Alternatively, such intracavity elements can be combined with flat, spherical or non-spherical end mirrors to form the resonant cavity. Accordingly, a Fabry-Perot optical resonant cavity pursuant to this embodiment is made of two mirrors which preferably, but not necessarily, are flat, and an intracavity element giving rise to families of transverse modes between longitudinal $TEM_{00}$ modes, of which the illustrated lens is only one example. Pursuant to the illustrated embodiment, families of transverse modes are merged into longitudinal $TEM_{00}$ modes of Fabry-Perot optical resonant cavity made of two mirrors and an intracavity element.

By way of example, we consider here the special case of a single thin lens of focal length f placed in the center of a resonant cavity having two flat mirrors, as shown in FIG. 9. The condition of merging m transverse modes with the longitudinal $TEM_{00}$ mode then is:

$$\infty > f > 4L[mF/\pi]^2 \qquad (11)$$

To simply the mathematical expression, the conditions $f >> L$ and $F >> 1$ are assumed for Equation (11).

Comparing Equation (11) with Equation (9), it is seen that the focal length f in Equation (11) or FIG. 9 in effect plays the role of the radius R in Equation (9) or FIG. 6 in merging transverse mode families into longitudinal $TEM_{00}$ modes. Indeed, one recalls in this connection the equation for focal length for a thin lens as $$\frac{1}{f} = (n-1)\left(\frac{1}{R_1} + \frac{1}{R_2}\right) \qquad (12)$$

wherein this time $R_1$ is the radius of curvature of one side of the lens 34, and $R_2$ is the radius of curvature on the other side of the lens 34, while n is its index of refraction.

In this case, both $R_1$ and $R_2$ are considered positive for a bi-convex lens. For the purpose of evaluation, we may set $R_1$ and $R_2$ as being equal or R, whereby the focal length f in terms of lens curvature becomes $$f = R/[2(n-1)] \qquad (13)$$

or Equation (11) becomes $$\infty > R > 8(n-1)L[mF/\pi]^2 \qquad (14)$$

wherein R is now the radius of lens curvature.

This lens curvature in effect assumes the role of the above mentioned mirror curvatures in giving the resonance cavity a non-confocal character with potential transverse modes that are merged into longitudinal TEM$_{00}$ modes pursuant to embodiments of the subject invention.

If the focal length f of the lens 34 is given, Equation (7) may be used by analogy to merge m transverse modes into longitudinal fundamental TEM$_{00}$ modes, pursuant to the following equation, if the cavity length L is less than $$L < (f/4)[\pi/mF]^2 \quad (15)$$

wherein:
f is the focal length of the lens in FIG. 9,
n is index of refraction of the intracavity lens,
m is the number of transverse modes merged to a fundamental TEM$_{00}$ mode,
$\pi = 3.1415926\ldots$,
F is cavity finesse, a dimensionless quantity equal to $$\frac{FSR}{\Delta\nu} \quad \text{same as (3)}$$

$\Delta\nu$ is the cavity bandwidth,
FSR is the Free Spectral Range of the Fabry-Perot optical resonant cavity equal to $$\frac{c}{2L} \quad \text{same as (4)}$$

c is the speed of light, and
L is the optical path length of the cavity between the mirrors.

All these teachings provide cavity designers and manufacturers with workable approaches to the achievement of superior optical resonance cavities with super high finesse and high Free Spectral Range performance, without significant transverse modes.

The subject extensive disclosure will render apparent or suggest to those skilled in the art various modifications and variations within the spirit and scope of the invention and of equivalents thereof.

We claim:

1. A method of minimizing the effect of transverse modes of a Fabry-Perot optical resonant cavity of a type having families of said transverse modes between longitudinal TEM$_{00}$ modes, comprising:
   merging said families of transverse modes into said longitudinal TEM$_{00}$ modes of said Fabry-Perot optical resonant cavity.

2. A method as in claim 1, wherein:
   said Fabry-Perot optical resonant cavity is made as a non-confocal cavity.

3. A method as in claim 1, wherein:
   said Fabry-Perot optical resonant cavity is a non-confocal resonant cavity made of two spaced spherical mirrors of different radii of curvatures $R_1$ and $R_2$; and
   merger of transverse modes with longitudinal TEM$_{00}$ modes is effected by dimensioning said radii as $$\infty > R_1 R_2 / (R_1 + R_2) > 4L[mF/\pi]^2$$

wherein:
m is the number of transverse modes merged to a fundamental TEM$_{00}$ mode,
$\pi = 3.1415926\ldots$,
F is cavity finesse, a dimensionless quantity equal to $$\frac{FSR}{\Delta\nu}$$

$\Delta\nu$ is cavity bandwidth,
FSR is the Free Spectral Range of the Fabry-Perot optical resonant cavity equal to $$\frac{c}{2L}$$

c is the speed of light,
L is the optical path length of the cavity between said spaced mirrors, and
$\infty$ is infinity.

4. A method as in claim 1, wherein:
   one of said mirrors is convex and
   one of said radii is negative for said convex mirror.

5. A method as in claim 1, wherein:
   said Fabry-Perot optical resonant cavity is a non-confocal spherical mirror cavity comprising two spaced spherical mirrors of equal radii of curvature R; and
   merger of transverse modes with longitudinal TEM$_{00}$ modes is effected by dimensioning R as $$\infty > R > 8L[mF/\pi]^2$$

wherein:
R is the radius of curvature of each of the spherical cavity mirrors,
m is the number of transverse modes merged to a fundamental TEM$_{00}$ mode,
$\pi = 3.1415926\ldots$,
F is cavity finesse, a dimensionless quantity equal to $$\frac{FSR}{\Delta\nu}$$

$\Delta\nu$ is cavity bandwidth,
FSR is the Free Spectral Range of the Fabry-Perot optical resonant cavity equal to $$\frac{c}{2L}$$

c is the speed of light,
L is the optical path length of the cavity between the mirrors, and
$\infty$ is infinity.

6. A method as in claim 1, wherein:
   said Fabry-Perot optical resonant cavity is a non-confocal resonant cavity made of two spaced mirrors of which one mirror is flat and the other mirror is curved about a radius R of $$\infty > R > 4L[mF/\pi]^2$$

wherein:
m is the number of transverse modes merged to a fundamental TEM$_{00}$ mode,
$\pi = 3.1415926\ldots$,
F is cavity finesse, a dimensionless quantity equal to $$\frac{FSR}{\Delta\nu}$$

$\Delta\nu$ is cavity bandwidth,

FSR is the Free Spectral Range of the Fabry-Perot optical resonant cavity equal to $$\frac{c}{2L}$$

c is the speed of light,
L is the optical path length of the cavity between said spaced mirrors, and
∞ is infinity.

7. A method as in claim 1, wherein:
said Fabry-Perot optical resonant cavity is a non-confocal resonant cavity made of two spaced mirrors of which at least one has a non-spherical configuration; and merger of transverse modes with longitudinal $TEM_{00}$ modes is effected by providing said mirrors with radii such that $$\infty > R_1R_2/(R_1+R_2) > 4L[mF/\pi]^2$$

wherein:
$R_1$ is the radius of the best fit circle which can be inscribed in said one mirror of non-spherical configuration,
$R_2$ is the radius of curvature of the other mirror,
m is the number of transverse modes merged to a fundamental $TEM_{00}$ mode,
$\pi = 3.1415926\ldots$,
F is cavity finesse, a dimensionless quantity equal to $$\frac{FSR}{\Delta\nu}$$

$\Delta\nu$ is cavity bandwidth,
FSR is the Free Spectral Range of the Fabry-Perot optical resonant cavity equal to $$\frac{c}{2L}$$

c is the speed of light,
L is the optical path length of the cavity between said spaced mirrors, and
∞ is infinity.

8. A method as in claim 1, wherein:
said Fabry-Perot optical resonant cavity is made of two mirrors and an intracavity element giving rise to families of transverse modes between longitudinal $TEM_{00}$ modes; and
said families of transverse modes are merged into said longitudinal $TEM_{00}$ modes of said Fabry-Perot optical resonant cavity made of said two mirrors and said intracavity element.

9. A method as in claim 6, wherein:
said mirrors are flat.

10. A method as in claim 1, wherein:
said Fabry-Perot optical resonant cavity is a non-confocal resonant cavity made of two spaced substantially flat mirrors and an intracavity lens; and
merger of transverse modes with longitudinal $TEM_{00}$ modes is effected by providing said lens with a focal length f of $$\infty > f > 4L[mF/\pi]^2$$

wherein:
m is the number of transverse modes merged to a fundamental $TEM_{00}$ mode, $\pi = 3.1415926\ldots$,
F is cavity finesse, a dimensionless quantity equal to $$\frac{FSR}{\Delta\nu}$$

$\Delta\nu$ is cavity bandwidth,
FSR is the Free Spectral Range of the Fabry-Perot optical resonant cavity equal to $$\frac{c}{2L}$$

c is the speed of light,
L is the optical path length of the cavity between said spaced mirrors, and
∞ is infinity.

11. A method as in claim 1, wherein:
said Fabry-Perot optical resonant cavity is a non-confocal spherical mirror cavity comprising two spaced mirrors; and
merger of transverse modes with longitudinal $TEM_{00}$ modes is effected below one-half cavity bandwidth by dimensioning the cavity length as $$L < (R/8)\,[\pi/mF]^2$$

wherein:
R is the radius of curvature of the cavity mirrors,
m is the number of transverse modes merged to a fundamental $TEM_{00}$ mode,
$\pi = 3.1415926\ldots$,
F is cavity finesse, a dimensionless quantity equal to $$\frac{FSR}{\Delta\nu}$$

$\Delta\nu$ is the cavity bandwidth,
FSR is the Free Spectral Range of the Fabry-Perot optical resonant cavity equal to $$\frac{c}{2L}$$

c is the speed of light, and
L is the optical path length of the cavity between the mirrors.

12. A method as in claim 11, wherein:
said mirrors have unequal radii $R_1$ and $R_2$; and
said radius of curvature R is equal to $$2R_1R_2/(R_1+R_2)$$

13. A method as in claim 1, wherein:
said Fabry-Perot optical resonant cavity is made of two spaced substantially flat mirrors and an intracavity lens; and
merger of transverse modes with longitudinal $TEM_{00}$ modes is effected below one-half cavity bandwidth by providing said intracavity lens with a focal length f and by dimensioning the cavity length so that $$L < (f/4)[\pi/mF]^2$$

wherein:
f is said focal length,
n is index of refraction of said intracavity lens, m is the number of transverse modes merged to a fundamental $TEM_{00}$ mode, $\pi = 3.1415926\ldots$, F is cavity finesse, a dimensionless quantity equal to $$\frac{FSR}{\Delta \nu}$$

$\Delta \nu$ is the cavity bandwidth,

FSR is the Free Spectral Range of the Fabry-Perot optical resonant cavity equal to $$\frac{c}{2L}$$

c is the speed of light, and

L is the optical path length of the cavity between the mirrors.

14. Resonant cavity apparatus, comprising in combination:

a Fabry-Perot optical resonant cavity of a type having families of transverse modes between longitudinal $TEM_{00}$ modes; and means for merging said families of transverse modes into said longitudinal $TEM_{00}$ modes of said Fabry-Perot optical resonant cavity.

15. Apparatus method as in claim 14, wherein:

said Fabry-Perot optical resonant cavity is a non-confocal cavity.

16. A Fabry-Perot optical resonant cavity bounded by spaced mirrors of which at least one is curved giving rise to families of transverse modes between longitudinal $TEM_{00}$ modes, wherein parameters of said resonant cavity obey an equation selected from the group of:

$$\infty > R_1 R_2/(R_1 + R_2) > 4L[mF/\pi]^2$$
$$\infty > R > 8L[mF/\pi]^2$$
$$\infty > R_3 > 4L[mF/\pi]^2$$
$$L < (R/8)[\pi/mF]^2$$

wherein:

R is the radius of curvature of each of said cavity mirrors if said cavity mirrors have equal radii, $R_1$ is a radius of curvature of one of said mirrors, and $R_2$ is a radius of curvature of the other mirror if said mirrors have unequal radii, $R_3$ is a radius of curvature of one of said mirrors if the other mirror is flat, with radius meaning radius of curvature of a spherical mirror and radius of curvature of a best fit circle in case of a non-spherically curved mirror, m is the number of transverse modes merged to said longitudinal fundamental $TEM_{00}$ mode, $\pi = 3.1415926\ldots$, F is cavity finesse, a dimensionless quantity equal to $$\frac{FSR}{\Delta \nu}$$

$\Delta \nu$ is cavity bandwidth,

FSR is the Free Spectral Range of said Fabry-Perot optical resonant cavity equal to $$\frac{c}{2L}$$

c is the speed of light,

L is the optical path length of said cavity between said spaced mirrors, and $\infty$ is infinity, whereby said m transverse modes are merged into longitudinal fundamental $TEM_{00}$ modes of said resonant cavity.

17. A method Fabry-Perot optical resonant cavity as in claim 16, wherein:

one of said mirrors is convex and one of said radii $R_1$ and $R_2$ is negative for said convex mirror.

18. A Fabry-Perot optical resonant cavity bounded by spaced mirrors, comprising in combination:

an intracavity element of a type giving rise to families of transverse modes between longitudinal $TEM_{00}$ modes; and means for merging said families of transverse modes into said longitudinal $TEM_{00}$ modes of said Fabry-Perot optical resonant cavity.

19. A Fabry-Perot optical resonant cavity as in claim 18, wherein:

said mirrors are flat.

20. A Fabry-Perot optical resonant cavity, comprising in combination:

two spaced substantially flat mirrors; and an intracavity lens;

said resonant cavity having a cavity length of $$L < (f/4)[\pi/mF]^2$$

wherein:

f is a focal length of said lens, n is index of refraction of said intracavity lens, m is the number of transverse modes merged to said longitudinal fundamental $TEM_{00}$ mode, $\pi = 3.1415926\ldots$, F is cavity finesse, a dimensionless quantity equal to $$\frac{FSR}{\Delta \nu}$$

$\Delta \nu$ is cavity bandwidth,

FSR is the Free Spectral Range of said Fabry-Perot optical resonant cavity equal to $$\frac{c}{2L}$$

c is the speed of light, and

L is the optical path length of said cavity between said spaced mirrors.

* * * * *